US010507863B2

(12) United States Patent
Naspolini et al.

(10) Patent No.: US 10,507,863 B2
(45) Date of Patent: Dec. 17, 2019

(54) DRIVE UNIT FOR VEHICLE STEERING

(71) Applicant: ARVUS TECNOLOGIA LTDA., Florianopolis, Santa Catarina (BR)

(72) Inventors: Adriano C. Naspolini, Florianopolis (BR); Jonatan Vieira, Florianopolis (BR); Daniel Fritzke Ferreira De Melo, Florianopolis (BR)

(73) Assignee: ARVUS TECNOLOGIA LTDA., Florianópolis (BR)

( * ) Notice: Subject to any disclaimer, the term of this patent is extended or adjusted under 35 U.S.C. 154(b) by 501 days.

(21) Appl. No.: 15/343,077

(22) Filed: Nov. 3, 2016

(65) Prior Publication Data
US 2017/0129533 A1 May 11, 2017

(30) Foreign Application Priority Data
Nov. 5, 2015 (EP) .................................... 15193313

(51) Int. Cl.
*B62D 5/04* (2006.01)
*H02K 11/215* (2016.01)
(Continued)

(52) U.S. Cl.
CPC ............. *B62D 5/0403* (2013.01); *B62D 3/02* (2013.01); *B62D 5/046* (2013.01); *B62D 5/0442* (2013.01);
(Continued)

(58) Field of Classification Search
CPC ...... B62D 5/0403; B62D 5/04; B62D 5/0415; B62D 5/0442; B62D 5/046; B62D 3/02;
(Continued)

(56) References Cited

U.S. PATENT DOCUMENTS

| 4,556,116 | A | 12/1985 | O'Neil | |
| 4,715,461 | A * | 12/1987 | Shimizu | B62D 5/0463 180/446 |
| 6,273,211 | B1 | 8/2001 | Engels et al. | |
| 7,306,535 | B2 * | 12/2007 | Menjak | B62D 5/008 180/444 |

(Continued)

FOREIGN PATENT DOCUMENTS

| DE | 10 2006 059 972 A1 | 6/2008 |
| DE | 10 2008 042 213 A1 | 3/2010 |

(Continued)

OTHER PUBLICATIONS

Extended European Search Report dated May 11, 2016 as received in Application No. 15193313.2.

*Primary Examiner* — Joseph M Rocca
*Assistant Examiner* — Michael R Stabley
(74) *Attorney, Agent, or Firm* — Maschoff Brennan

(57) ABSTRACT

The invention relates to a Drive unit as part of a vehicle steering comprising a housing, mechanically connectable to the vehicle through an anti-rotation system, a rotatory output element, an interface for interfacing the control unit, including powering coils and measuring feedback to external control unit, and a motor comprising an angular position sensor, a stator and a rotor, the stator being fixedly mounted in the housing, and the rotor being rotatably mounted in the housing, wherein the output element, the stator and the rotor are coaxially arranged, wherein the motor is mechanically coupled to the output element by a differential providing an angular speed for the output element which is different from the angular speed of the rotor.

20 Claims, 7 Drawing Sheets

(51) Int. Cl.
*H02K 11/22* (2016.01)
*B62D 3/02* (2006.01)
*B62D 7/20* (2006.01)
*F16H 48/10* (2012.01)
*H02K 7/116* (2006.01)

(52) U.S. Cl.
CPC .............. *B62D 7/20* (2013.01); *F16H 48/10* (2013.01); *H02K 7/116* (2013.01); *H02K 11/215* (2016.01); *H02K 11/22* (2016.01)

(58) Field of Classification Search
CPC ........ B62D 7/20; B62D 11/06; H02K 11/215; H02K 11/22; H02K 7/116; F16H 48/10
USPC .......................................................... 475/29
See application file for complete search history.

(56) References Cited

U.S. PATENT DOCUMENTS

| | | | |
|---|---|---|---|
| 7,735,597 B2* | 6/2010 | Higashi | B62D 5/0415 180/441 |
| 8,892,308 B2 | 11/2014 | Davis et al. | |
| 2008/0264714 A1* | 10/2008 | Morikawa | B62D 5/008 180/446 |
| 2011/0088962 A1 | 4/2011 | Huang | |

FOREIGN PATENT DOCUMENTS

| | | | | |
|---|---|---|---|---|
| EP | 0 403 234 A2 | 12/1990 | | |
| EP | 1 013 534 A1 | 6/2000 | | |
| EP | 1 031 491 A1 | 8/2000 | | |
| JP | 60154956 A * | 8/1985 | ........... | B62D 5/0415 |
| JP | S60-154956 A | 8/1985 | | |

* cited by examiner

DRIVE UNIT FOR VEHICLE STEERING

FIELD

The present invention relates to a drive unit designated for being used as part of a vehicle steering.

BACKGROUND

Drive units for an automatic steering of vehicles used in landscaping, farming and soil care are known from prior art. Such automatic steering systems are needed to economise fuel and/or agricultural material, to unburden manpower and to improve field coverage during a processing job. For example, overlaps may be avoided, when ploughing soil, mowing grass, spreading fertilizer or harvesting crops. Furthermore, a specifically directed route along a predetermined path may be required, for which positional systems, such as GNSS or RADAR based systems are typically used along with the steering control.

These steering control systems typically comprise a mechanical steering assembly conventionally consisting of a steering wheel, a steering column encompassing a steering rod, a rack and a pinion, tie rods and kingpins. They further comprise a drive unit for a controlled driving of the steering assembly, e.g. by means of the steering wheel itself, or by means of the steering rod mounted in the steering column.

Known vehicle steering systems are built deep into the vehicle interior and are therefore quasi permanently fixed and immovable. A control unit manages a motor adjusting the position of a steering wheel or steering rod, whereby the steering wheel usually is still usable by a driver, and the control unit either takes over when the driver is not steering or intervenes when the command of the driver needs to be corrected. One disadvantage of such a system is that it only comes with the vehicle and is therefore not withdrawable and mountable into other vehicles which are not yet equipped with such automatic steering system.

Other vehicle guidance systems, such as disclosed in the patent publication U.S. Pat. No. 8,892,308, are therefore portable, and mountable on a steering column, where they provide a motor for directly driving a steering rod. With this, a driver may take his steering assembly from vehicle to vehicle, or "modernise" an existing vehicle by implanting such guidance system into it.

However, with drive units from prior art it is not possible or not satisfyingly possible to further configure the drive characteristics and therewith adapt to specific circumstances or vehicle properties. Especially when the vehicle guidance system must be modular and mountable into different vehicles, one motor configuration must fit all settings. For example, when unfavourable circumstances such as muddy and sticky underground or special vehicle properties, such as dimensions of wheels or heavy duty are given, the engine map of a motor of a driven steering system may not be suitable to satisfy the requirements of the steering.

SUMMARY

Some embodiments of the present invention provide an alternative drive unit as being part of a vehicle steering with a further manipulability of the drive characteristics.

It is a further object of the present invention to provide a drive unit as being part of a vehicle steering, with an improved controllability of the steering. It is yet a further object of the present invention to provide a drive unit as being part of a vehicle steering, with an improved adaptability of the drive unit to different steering assemblies.

Some embodiments of the invention relate to a drive unit for a vehicle steering system (i.e. as part of a vehicle steering), the drive unit comprising a housing, mechanically connectable to the vehicle, a rotatory output element, an interface for receiving steering control signals, and a motor comprising a stator and a rotor, the stator being fixedly mounted in the housing, and the rotor being rotatably mounted in the housing, wherein the output element, the stator and the rotor are coaxially arranged, wherein the rotor of the motor is mechanically coupled to the output element by a differential providing an angular speed (and/or direction of rotation) for the output element being different from the angular speed (and/or direction of rotation) of the rotor.

The drive unit may further comprise an angular position sensor for providing an actual angle for the output element. This allows deriving an actual steering angle. The position sensor can be placed directly at the rotor (i.e. directly measuring the rotation angle of the rotor relative to the stator, then the directly measured angle has to be compiled into an angle for the output element, by applying knowledge about the differential) or directly at the output element (i.e. directly measuring the rotation angle of the output element relative to the stator). The angle signals then can be made available through the interface to other internal or to external units, e.g. a control unit.

In one embodiment of the invention an automatic steering system may be provided comprising the drive unit. The steering system may further comprise a control unit for regulating the drive unit dependent on position and orientation information of the vehicle which is determined by a positioning system, the control unit particularly having an interface for receiving actual angle signals, for supplying steering control signals, for supplying electrical power and/or for the input of information data. The control unit may be embodied as a separate unit (with an own housing) or may be integrated into the housing of the drive unit (i.e. so that the drive unit and the control unit have one same housing).

In a further embodiment of the invention the differential is an epicyclic gearing, or a strain wave gearing, or a combination thereof.

In a further embodiment of the invention the epicyclic gearing comprises a sun wheel, a carrier, a planet gear, and a ring gear.

In a further embodiment of the invention the epicyclic gearing comprises a sun wheel, fixedly connected with the housing, a carrier as being the output element, mechanically linked to a steering rod adapter, a planet gear, rotatably mounted in the carrier and engaging with the sun wheel, and a ring gear, rotatable by the motor and engaging with the at least one planet gear.

In a further embodiment of the invention the output element is connected to a steering rod adapter.

In a further embodiment of the invention the drive unit further comprises a steering wheel which is connectable with the housing and/or a steering rod adapter.

In a further embodiment of the invention further comprising a steering wheel and a steering rod adapter, wherein the steering wheel is connected to a core tube which is itself connected to the output element, and the steering rod adapter, and therewith the output element being connected to the steering rod adapter indirectly via the steering wheel.

In a further embodiment of the invention the electric motor is one of the group: brushless direct current electric motor, ultrasonic motor, asynchronous motor.

In a further embodiment of the invention the rotor is arranged to drive the ring gear and the stator is fixedly connected with the housing.

In a further embodiment of the invention the rotor is arranged to drive the carrier and the stator is fixedly connected with the housing.

In a further embodiment of the invention the rotor is arranged to drive the sun wheel and the stator is fixedly connected with the housing.

In a further embodiment of the invention the steering rod adapter is rotatable relative to the rotor and the stator, and the carrier is rotatable relative to the ring gear and the housing.

In a further embodiment of the invention, by means of at least the steering rod adapter and a Cardan shaft and/or a gearbox, at least one, in particular two or more vehicle axles are steerable.

BRIEF DESCRIPTION OF THE FIGURES

In the following, the invention will be described in detail by referring to example embodiments that are accompanied by figures, in which.

DETAILED DESCRIPTION

Figure 1:
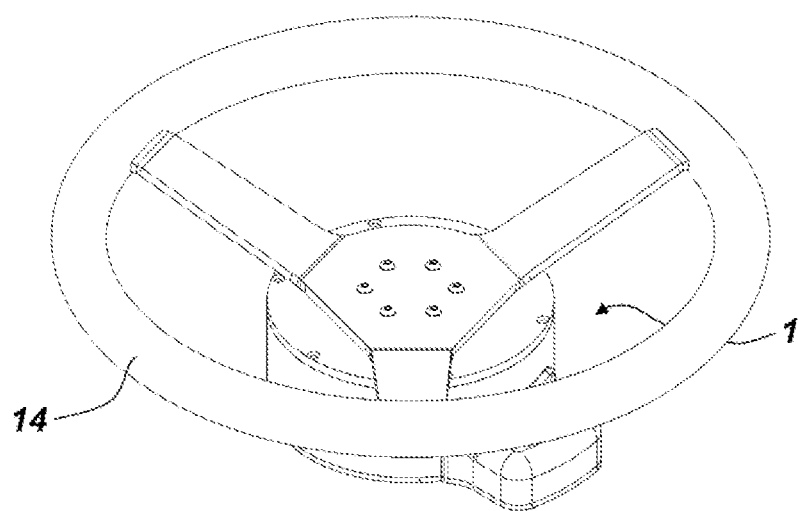
FIG. 1: is a sectional view of a steering assembly with a drive unit according to the invention.

FIG. 1 shows a drive unit 1 according to the invention comprising a steering wheel 14 directly screwed on it. This "steering kit" is able to be directly built into a vehicle, particularly onto a vehicle's steering column, which lays open the vehicle's steering rod.

Figure 2:
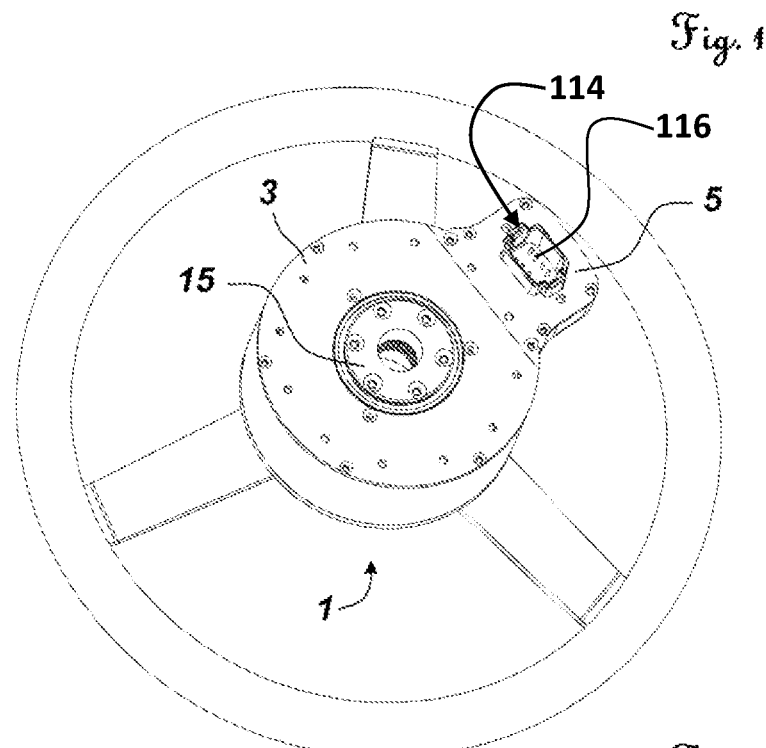
FIG. 2: is a sectional view of a further steering assembly with a drive unit according to the invention.

FIG. 2 shows the steering kit of FIG. 1 from the back side, where the steering rod adapter 15 is exposed. For mounting the kit into a vehicle, the steering rod is inserted into the adapter 15. The steering rod adapter 15 may have different forms, according to the spline surface or keyway of the steering shaft. Internal gear in the adapter and external gear on the steering rod make sure that both components are rigidly mounted with respect to at least rotation. FIG. 2 further shows an interface 114 on the control unit 5 which is optionally comprised by the drive unit 1. The interface 114 for interfacing the control unit 5 includes powering elements 116.

Figure 6:
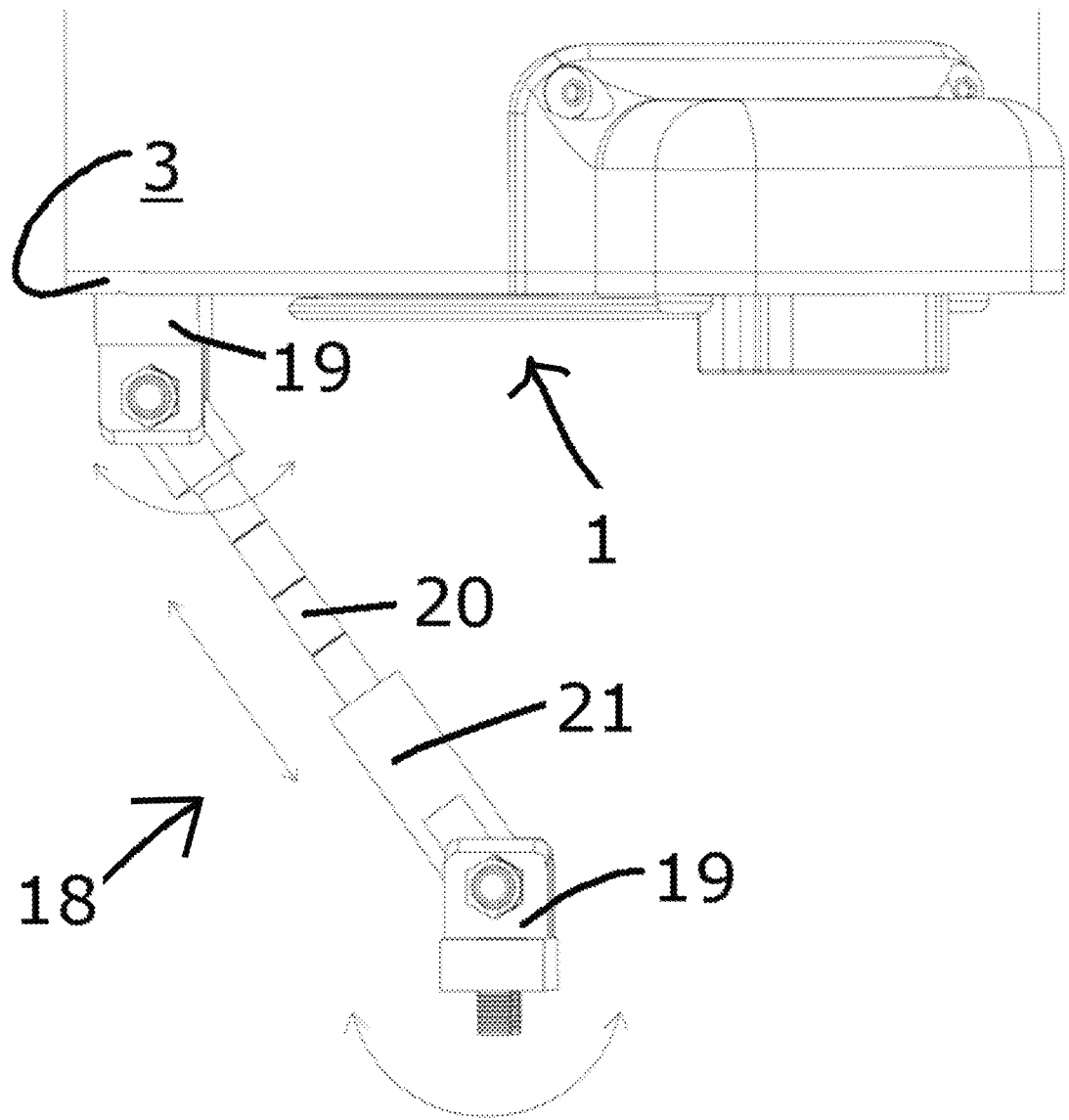
FIGS. 6-8: show the drive unit together with an example for an anti-rotation element in different views.
Figure 7:
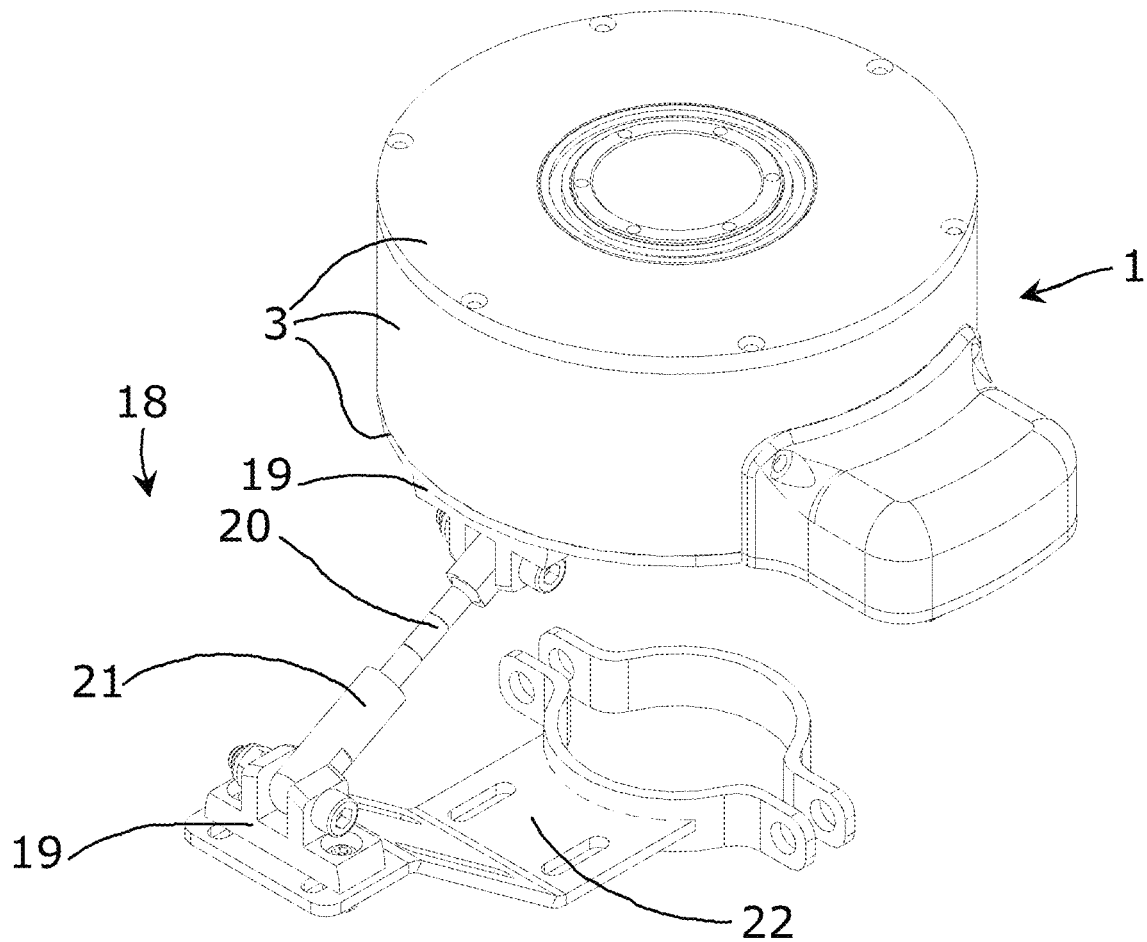
Figure 8:
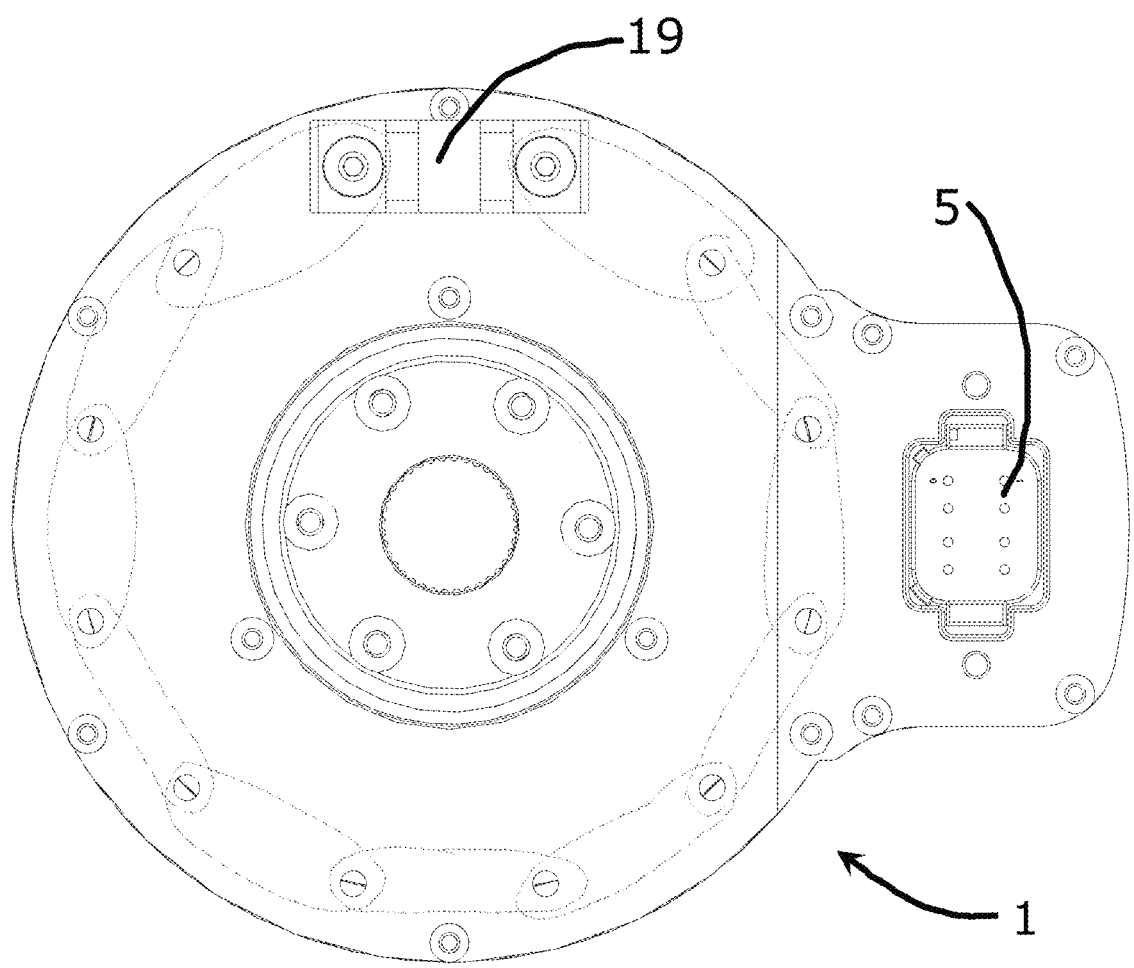

While fitting the drive unit onto a vehicles steering column, the interface is at the same time plugged to—by way of example—a control unit based in the vehicle, supplying the drive unit with information based on the vehicle's position, orientation, speed etc, and with electrical power, particularly in order to control the motor inside of the drive unit. However, as mentioned already before, such control unit may—in another example—also be integrated into the housing of the drive unit. The drive unit 1 is bordered by the housing 3. In an embodiment of the drive unit according to the invention, the housing 3 is—in a state being mounted in the vehicle as described above—mechanically connected to the vehicle's chassis through an anti-rotation element, as shown in FIGS. 6, 7 and 8. The anti-rotation element 18 is attached or attachable to the housing 3 comprises a fastener for establishing a joint (i.e. a mechanical fixed linkage) with a fixed part of the vehicle and therewith provides for a mechanical link between the housing and said fixed part. The anti-rotation element 18 provides a steering reaction torque and prevents from rotation of the drive unit 1 (and hence the stator 13 of motor 6) relative to the vehicle. One of two bases is directly screwed on the housing 3. The pin 20 is rotationally coupled in the first base by a bolt. This allows a rotatory motion on the screw axis. The pin 20 is inserted into the socket 21, allowing a translational motion of the pin towards its axis. This coupling absorbs some vibration in the axial direction of the motor. Another base 19 is directly screwed on a bracket 22, which in turn is fixedly coupled. The bracket 21 may have different forms according the vehicle. The base 19 that is attached on the housing 3 can be fixed at various positions, depending on the better position for the interface control unit 5 prevent it hitting the vehicle cab.

Figure 3:
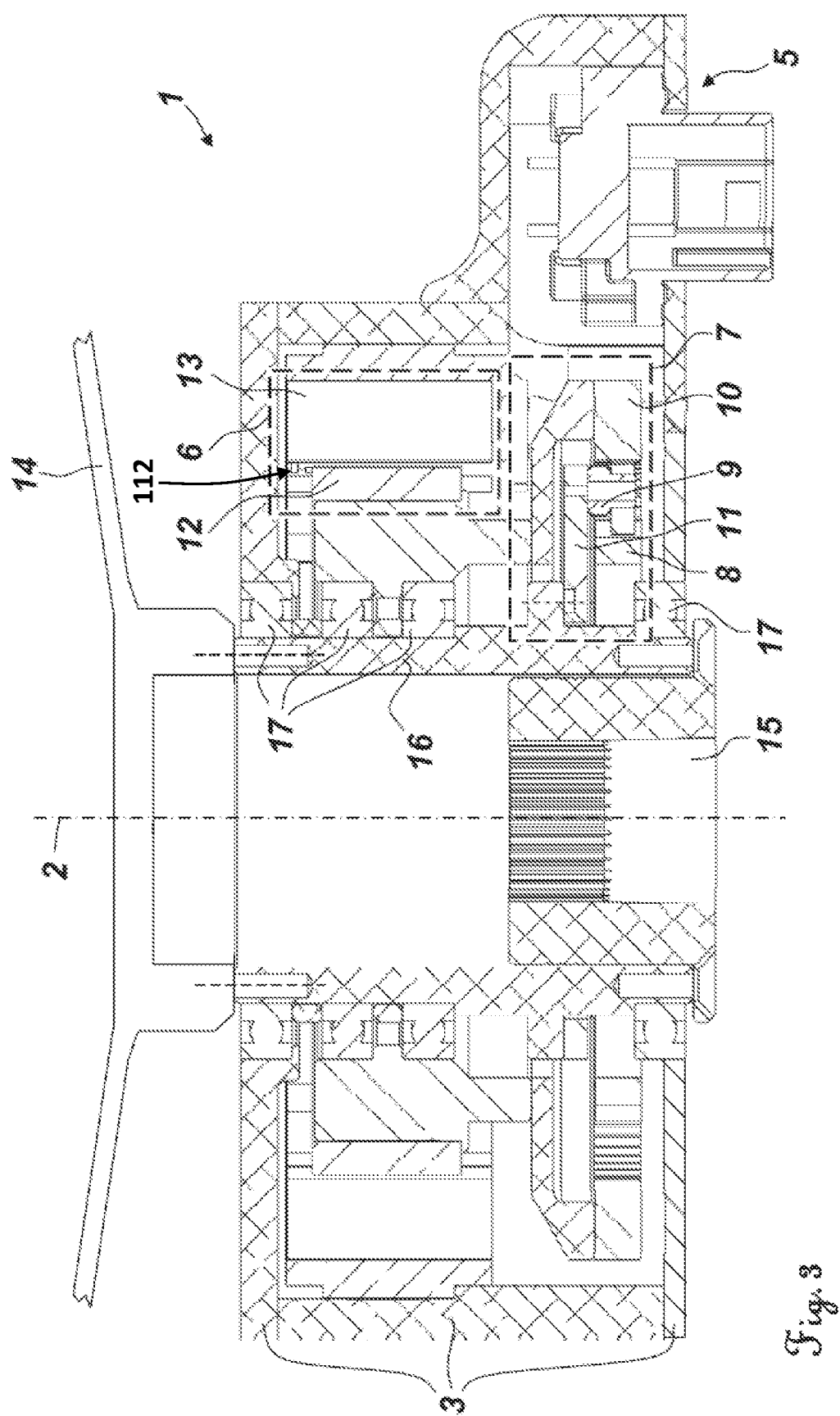
FIG. 3: is a sectional view of a further steering assembly with a drive unit according to the invention.

FIG. 3 shows a cross-sectional view of a drive unit according to the invention. Housing 3, herein, embraces the motor 6 comprising a stator 13 and a rotor 12, a differential gear 7 which is an epicyclic gearing comprising a sun wheel 8, at least one planet gear 9 and a ring gear 10. The drive unit 1 further comprises a core tube 16 that may be mounted to steering rod adapter 15 and a steering wheel 14.

Since steering rod adapter 15 is, in the end, the part which needs to be driven by the motor, it is already apparent, the every other parts directly or indirectly connected with adapter 15 must be also be affected by the motors motion with regard to rotation. The first part directly connected to adapter 15 is core tube 16 which is mounted in the housing 3 by means of bearings 17 which can be of any type. Core tube 16 is directly connected to carrier 11, in which at least one planet gear 9 is rotatably mounted. The at least one planet gear 9 is—towards the steering axis 2—engaged with a sun wheel 8 and—fromward the steering axis 2—engaged with a ring gear 10. The sun wheel 8 is fixedly connected to the housing 3 (connection is not shown), so that it does not rotate with respect to the housing. Ring gear 10 is—in the shown example indirectly via at least one intermediate part—connected to the rotor 12 of the motor 6.

In the exemplary FIG. 3 can be seen, that the two outside bearings (axially regarded) have a different speed ratio of the inner ring and the outer ring than the two inside bearings, which are coupled to an intermediate part of the rotor. The outer rings of the outside bearings stand still as they are coupled to the housing 3. The inside rings of all bearings 17 have the same speed, namely the speed of the core tube 16. The outer rings of the inside bearings, however, possess the speed of the rotor 12.

Stator 13 is fixedly mounted in the housing 3 and interacts with rotor 12 for example in the manner of a brushless electric motor. Other electrical motors are of course usable as well in the drive unit according to the invention.

The ring gear 10 being rotated by the motor 6 means that the gears of ring gear 10, which are engaged with the gears of the planet gear 9, cause the "pick up" of planet gear 9. Because the gears of planet gear 9 are on the other side also engaged with the sun wheel 8, which is fixed in place, the planet gears 9 are rolling around sun wheel 8. A gear ratio, particularly different from 1:1, is established between the angular speeds of the centre of planet gear 9 and the angular speed of ring gear 10, in accordance to the diameters of all participated wheels. In its centre, planet gear 9 is mounted in carrier 11, for example by means of a pin, which is rotatably mounted in both the carrier 11 and the planet gear 9 and which axially fixes the planet gear 9 in its connection to the carrier.

FIG. 3 also shows an angular position sensor 112 for providing angular position information depending on an actual steering angle. In an aspect, the angular position sensor 112 is placed such that it directly measures an angular position of the rotor 12 relative to the stator 13 or such that it directly measures an angular position of the output element relative to the stator 13, especially wherein the angular position sensor 112 is embodied as optical angle encoder or hall effect sensor. In some aspects, the interface is adapted for feeding back the measured angular position information.

Figure 4:
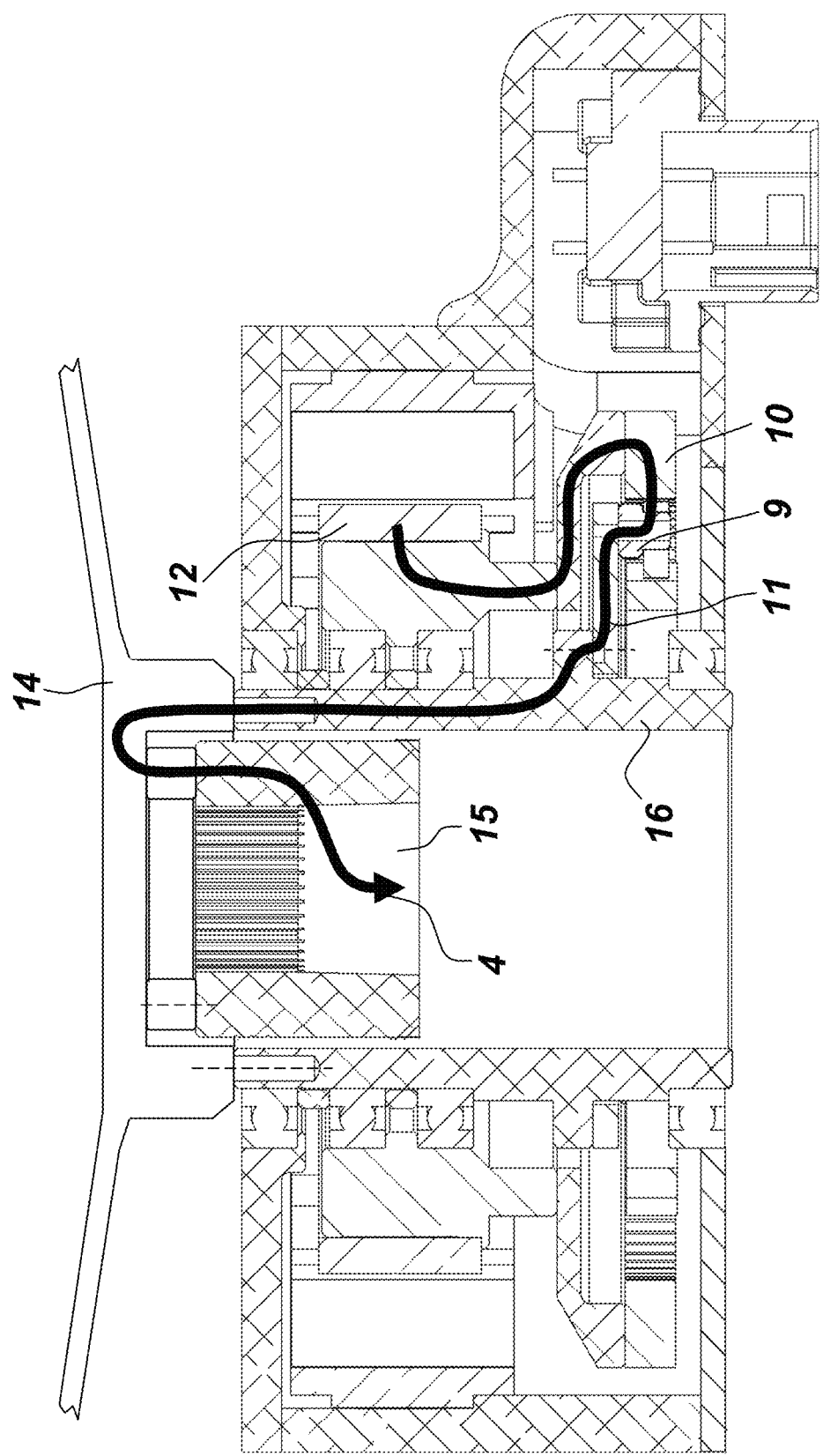
FIG. 4: shows another example of a drive unit according to the invention.

FIG. 4 shows another example of a drive unit according to the invention. In this example, the steering rod adapter 15 is not directly connected to the output element, which is the carrier 11, but only indirectly via steering wheel 14. For this case, arrow 4 shows the flow of the rotatory motion transfer from the rotor 12 over the ring gear to the planet gear 9, then over the carrier 11 to the core tube 16, and over the steering wheel 14 to the rod adapter 15, which—in the end—drives the steering rod.

Figure 5:
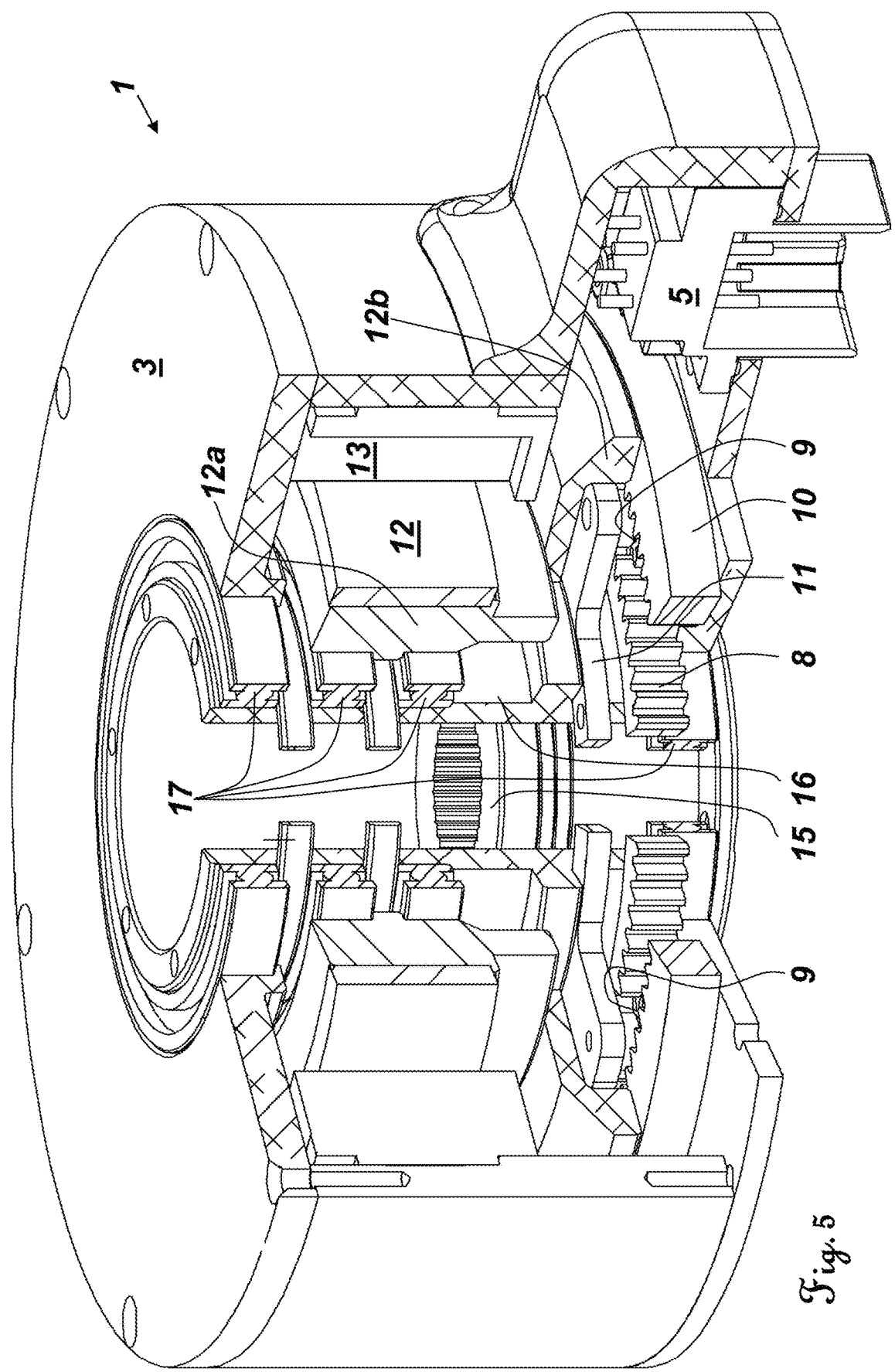
FIG. 5: shows the drive unit of FIG. 3 in a perspective part-sectional view.

FIG. 5 shows the drive unit 1 of FIG. 3 in a perspective part-sectional view. The optional steering rod adapter 15 is fixed to the bottom of the drive unit, namely onto the core tube 16. The optional steering wheel is not part of this embodiment, but can as well be screwed onto the core tube 16, as it is shown in FIG. 3.

Again, it can be seen that the core tube 16 is mounted inside the drive unit 1 with the bearings 17, of which the lowest and the topmost are mounted in the housing 3 and the two bearings inbetween are mounted in the ring affixed to the rotor 12.

The carrier 11 fixedly connected to the core tube 16 is carrying planet gears 9 (two are visible in the figure, more than two are possible naturally), which are rotatable about their own centre axes, wherein these centres are placed in the projections of the carrier where an appropriate bearing is provided. Furthermore, together with the carrier's rotation about the steering axis 2 (shown in FIG. 3), the centres of the planet gears rotate about the steering axis. Since sun wheel 8 is fixed in place, as it is connected to the housing 3, ring gear 10 drives the planet gears 9 and therewith the carrier 11 about said steering axis. Ring gear is driven by the rotor 12, wherein the ring gear is mechanically linked to the rotor 12 over intermediate parts 12a, 12b.

Although the invention is illustrated above, partly with reference to some preferred embodiments, it must be understood that numerous modifications and combinations of different features of the embodiments can be made.

Specifically, in other embodiments, the connections of the motor with the differential and the differential with the output element may be structured differently.

As shown in the figures and described above, the sun wheel is fixed in place. The rotor of the motor (when operating) and the output element (which is to be understood as at least one of the group of: steering rod adapter 15, steering wheel 14, core tube 16) are rotating in the same direction and with a transmission ratio from the fast (input=rotor) to the slow (output=output element).

In a further embodiment, the carrier is fixed in place. When the motor is in operation, the rotor and the output element are rotating in an opposite direction. When the rotor is connected to the sun wheel and the output element is connected to the ring gear, the rotor and the output element are rotating with a transmission ratio from the fast (input=rotor) to the slow (output=output element). When the rotor is connected to the sun wheel and the output element is connected to the ring gear, the rotor and the output element are rotating with a transmission ratio from the slow (input=rotor) to the fast (output=output element).

In a further embodiment the ring gear is fixed in place. When the motor is in operation, the rotor and the output element are rotating in the same direction. When the rotor is connected to the sun wheel, the rotor and the output element are rotating with a transmission ratio from the fast (input=rotor) to the slow (output=output element). When the rotor is connected to the carrier, the rotor and the output element are rotating with a transmission ratio from the slow (input=rotor) to the fast (output=output element).

What is claimed is:

1. A drive unit for a vehicle steering system, the drive unit comprising:
    a housing, mechanically connectable to a vehicle,
    a rotatory output element,
    an interface for interfacing a control unit,
    a motor comprising a stator and a rotor, the stator being fixedly mounted in the housing, and the rotor being rotatably mounted in the housing, and
    an angular position sensor for providing angular position information depending on an actual steering angle, wherein the position sensor is placed such that it directly measures an angular position of the rotor relative to the stator or such that it directly measures an angular position of the output element relative to the stator,
    wherein the interface is adapted for feeding back the measured angular position information,
    wherein the output element, the stator and the rotor are coaxially arranged,
    wherein the rotor of the motor is mechanically coupled to the output element by a differential.

2. The drive unit according to claim 1, wherein the interface for interfacing the control unit is configured for receiving steering control signals.

3. The drive unit according to claim 1, wherein the interface for interfacing the control unit includes powering elements.

4. The drive unit according to claim 1, wherein the differential is configured to provide an angular speed.

5. The drive unit according to claim 4, wherein the differential is configured to provide a direction of rotation for the output element being different from the angular speed.

6. The drive unit according to claim 4, wherein the differential is an epicyclic gearing, comprising
    a sun wheel,
    a ring gear, and
    a planet gear engaging with the sun wheel and the ring gear, the planet gear being rotatably mounted to and held by a carrier.

7. The drive unit according to claim 6, wherein
    the sun wheel is fixedly connected with the housing,
    the carrier is linked to the output element, and
    the ring gear is linked to the rotor of the motor.

8. The drive unit according to claim 6, wherein
    the sun wheel is linked to the output element,
    the carrier is fixedly connected with the housing, and
    the ring gear is linked to the rotor of the motor.

9. The drive unit according to claim 6, wherein
    the sun wheel is linked to the rotor of the motor,
    the carrier is linked to the output element, and
    the ring gear is fixedly connected with the housing.

10. The drive unit according to claim 6, wherein
the sun wheel is linked to the rotor of the motor,
the carrier is fixedly connected with the housing, and
the ring gear is linked to the output element.

11. The drive unit according to claim 6, wherein
the sun wheel is fixedly connected with the housing,
the carrier is linked to the rotor of the motor, and
the ring gear is linked to the output element.

12. The drive unit according to claim 6, wherein
the sun wheel is linked to the output element,
the carrier is linked to the rotor of the motor, and
the ring gear is fixedly connected with the housing.

13. The drive unit according to claim 1, wherein the differential is configured to provide a direction of rotation of the rotor.

14. The drive unit according to claim 1,
wherein the angular position sensor is embodied as optical angle encoder or hall effect sensor.

15. The drive unit according to claim 1, wherein:
the control unit for regulating the drive unit dependent on position and orientation information of the vehicle which are determined by a positioning system, the control unit having the interface for the supply of electrical power and/or the steering control signals.

16. The drive unit according to claim 1, wherein the differential is an epicyclic gearing, or a strain wave gearing, or a combination thereof.

17. The drive unit according to claim 1, wherein the drive unit further comprises
a steering wheel connector at the output element or as part of the output element or fixedly linked to the output element.

18. The drive unit according to claim 1, wherein the drive unit further comprises
a steering rod adapter at the output element or fixedly linked to the output element.

19. The drive unit according to claim 1, wherein an anti-rotation element is attached or attachable to the housing, the anti-rotation element comprising a fastener for establishing a joint with a fixed part of the vehicle and therewith for providing for a mechanical link between the housing and said fixed part so as to prevent rotation of the housing relative to the vehicle.

20. The drive unit according to claim 1, wherein the electric motor is selected from a group consisting of one of:
a brushless direct current electric motor,
an ultrasonic motor, and
an asynchronous motor.

* * * * *